(12) United States Patent
Lloyd, II et al.

(10) Patent No.: US 11,195,023 B2
(45) Date of Patent: Dec. 7, 2021

(54) FEATURE GENERATION PIPELINE FOR MACHINE LEARNING

(71) Applicant: Microsoft Technology Licensing, LLC, Redmond, WA (US)

(72) Inventors: Christopher Wright Lloyd, II, New York City, NY (US); Konstantin Salomatin, San Francisco, CA (US); Jeffrey Douglas Gee, San Francisco, CA (US); Mahesh S. Joshi, Belmont, CA (US); Shivani Rao, Mountain View, CA (US); Vladislav Tcheprasov, Lafayette, CA (US); Gungor Polatkan, San Jose, CA (US); Deepak Kumar Dileep Kumar, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 812 days.

(21) Appl. No.: 16/024,814

(22) Filed: Jun. 30, 2018

(65) Prior Publication Data
US 2020/0005045 A1   Jan. 2, 2020

(51) Int. Cl.
G06K 9/00 (2006.01)
G06N 20/00 (2019.01)
G06K 9/62 (2006.01)

(52) U.S. Cl.
CPC ....... G06K 9/00744 (2013.01); G06K 9/6228 (2013.01); G06K 9/6257 (2013.01); G06N 20/00 (2019.01)

(58) Field of Classification Search
CPC ... G06K 9/00744; G06K 9/6228; G06N 20/00
USPC .......................................... 706/12
See application file for complete search history.

(56) References Cited

U.S. PATENT DOCUMENTS

2021/0049274 A1* 2/2021 Ikeda ................. G06K 9/6263

* cited by examiner

Primary Examiner — Jeffery A Williams
(74) Attorney, Agent, or Firm — NDWE, LLP.

(57) ABSTRACT

Techniques for implementing a feature generation pipeline for machine learning are provided. In one technique, multiple jobs are executed, each of which computes a different set of feature values for a different feature of multiple features associated with videos. A feature registry is stored that lists each of the multiple features. After the jobs are executed and the feature registry is stored, a model specification is received that indicates a set of features for a model. For each feature in a subset of the set of features, a location is identified in storage where a value for said each feature is found and the value for that feature is retrieved from the location. A feature vector is created that comprises, for each feature in the set of features, the value that corresponds to that feature. The feature vector is used to train the model or as input to the model.

20 Claims, 3 Drawing Sheets

FEATURE GENERATION PIPELINE FOR MACHINE LEARNING

TECHNICAL FIELD

The present disclosure relates to generating machine-learned models and, more particularly, to a new feature generation framework that reduces errors in models and increases model iteration velocity.

BACKGROUND

Current approaches for training models using machine learning techniques are laborious. Such approaches require a user to compose executable jobs (e.g., in the form of scripts) that define features for a model. For each feature, the user must specify the data to extract, the operations that are to be performed on that data, and the locations where the output of those operations are to be stored. The problem intensifies if many different models are trained and validated in order to see which performs better. Such a manual process not only takes a significant amount of time but also results in many errors.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for feature generation that facilitates the generation of new models are provided. A new feature generation framework allows rapid iteration velocity to test new models and reduces errors when developing new machine-learned models. The feature generation framework includes a model specification, a feature registry upon which the model specification depends, and a feature engine that computes a feature vector for each training instance and scoring instance based on the model specification. Such a framework decouples the feature development process from feature vector generation during training and scoring.

System Overview

Figure 1:
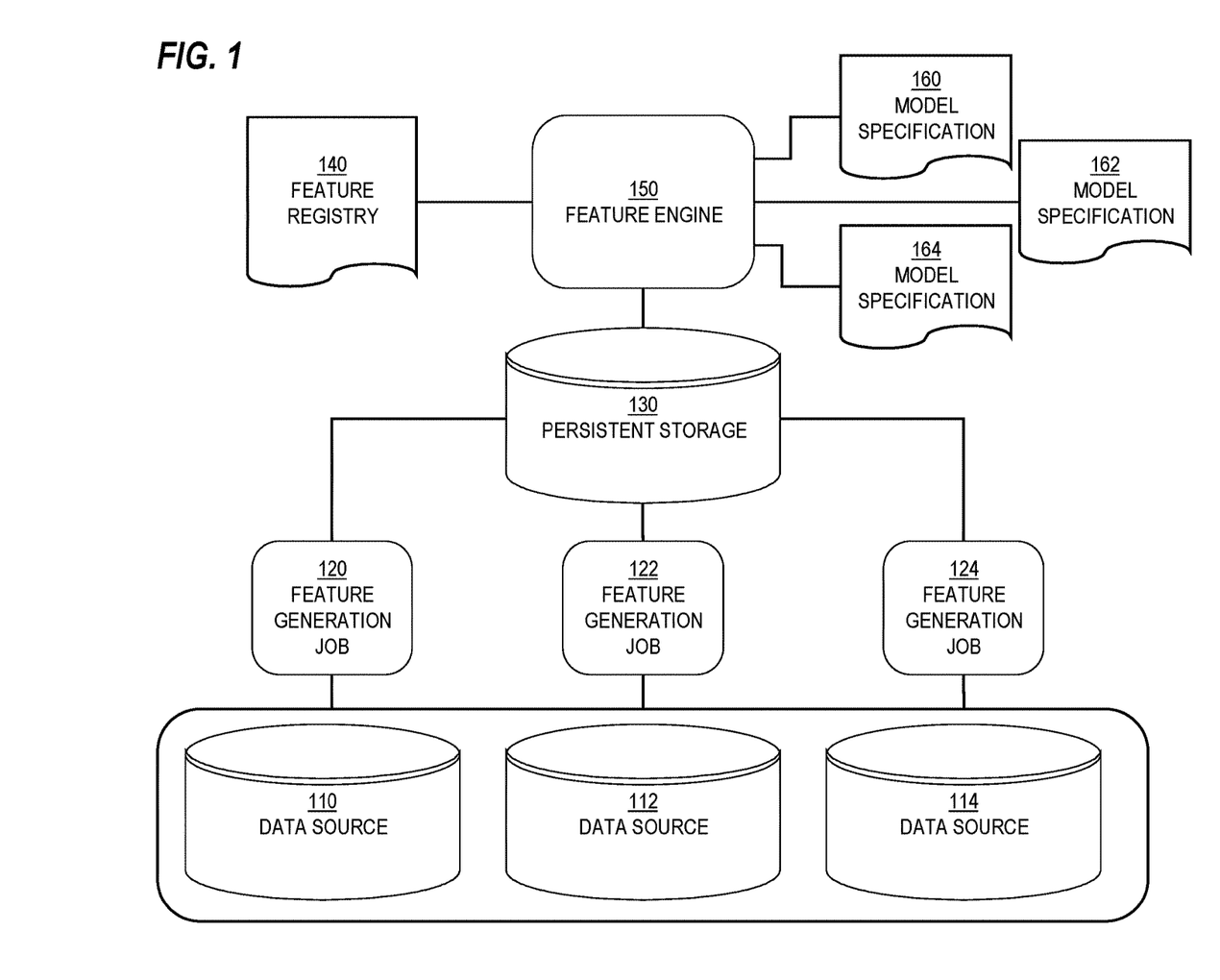
FIG. 1 is a block diagram that depicts an example feature engineering system, in an embodiment.

FIG. 1 is a block diagram that depicts an example feature engineering system 100, in an embodiment. Feature engineering system 100 includes data sources 110-114, feature generation jobs 120-124, persistent storage 130, a feature registry 140, a feature engine 150, and model specifications 160-164.

Data sources 110-114 contain data that are required to generate features. Features may be virtually any type of data. In the domain of video and/or course recommendations, example features include skills from user profiles, skills associated with courses or individual videos, number of profile page views by each user, number of job posting views by each user, length of each video, an embedding of a title of each video, etc. Although three data sources are depicted, feature engineering system 100 may include more or fewer data sources.

Each of feature generation jobs 120-124 is a job that executes on one or more computing devices. An example of a job is a Hadoop job that may be executed on multiple computing device concurrently. Apache Hadoop is a collection of open-source software utilities that facilitate using a network of many computers to solve problems involving massive amounts of data and computation. Hadoop provides a software framework for distributed storage and processing of big data using the MapReduce programming model. Originally designed for computer clusters built from commodity hardware, Hadoop has also found use on clusters of higher-end hardware. All the modules in Hadoop are designed with a fundamental assumption that hardware failures are common occurrences and should be automatically handled by the framework. The core of Apache Hadoop consists of a storage part, known as Hadoop Distributed File System (HDFS), and a processing part which is a MapReduce programming model. Hadoop splits files into large blocks, distributes them across nodes in a cluster, and then transfers packaged code into nodes to process the data in parallel. This approach takes advantage of data locality, where nodes manipulate the data to which those nodes have access. This allows the dataset to be processed faster and more efficiently than it would be in a more conventional supercomputer architecture that relies on a parallel file system where computation and data are distributed via high-speed networking.

Thus, the feature development stage involves designing a flow to compute raw features. A new feature computation can be added as a completely separate Hadoop flow or added to an existing flow. After adding a flow, a corresponding feature name is added to feature registry 140 of existing features (described in more detail below) to make the new feature available to the rest of the machine learning modeling system.

Each feature generation job retrieves data from one or more of data sources 110-114 as input (although FIG. 1 depicts each feature generation job as retrieving data from each data source) and generates multiple feature values as output. Each feature generation job stores output in persistent storage 130, which may be separate from any of data sources 110-114. Persistent storage 130 may be a database system or a file system. An example of a file system is HDFS (or Hadoop Distributed File System), which is storage part of Apache Hadoop. Some feature generation jobs 110-114 may run regularly, such as hourly, daily, weekly, or monthly and analyze data that is associated with a timestamp in a certain time window, such as the last hour, the last day, the last week, the last 30 days, etc.

Each feature generation job generates output that conforms to a format that is recognizable to feature engine 150 or that feature engine 150 is configured to read.

Feature Registry

Feature registry 140 is a registry or listing of all (or most) features used in machine learning algorithms. Features may be raw or derived. A raw feature is one for which a feature generation job has been composed or will be composed. A derived feature is a feature that can be computed on-the-fly from one or more raw features. Thus, a feature generation job may be composed before or after creating an entry in feature registry 140.

Feature registry 140 may contain, for each feature, a storage location data that is used to retrieve, from persistent storage 130, output of the corresponding feature generation job. In fact, the name of a feature may be the basis for identifying the corresponding storage location in persistent storage 130. Feature registry 140 may also contain, for each feature, a data type, such as a string, character array, a float, or other numeric type. Feature registry 140 may also contain a computation formula for derived features, a type indicator that indicates a type of entity that the feature describes (e.g., Member, Job, Course, Event, etc.), and one or more availability dates for that feature. The following is an example snippet from feature registry 140:

```
object Features {
  // Example of raw member feature (seniority)
  val Seniority = BasicFeatureDef("seniority", Member)
  // Example of raw course feature (difficulty)
  val CourseDifficulty = BasicFeatureDef("courseDifficulty", Course)
  // Example of derived feature (cross between member seniority
  and course
  // difficulty), CrossOperation is referencing the operation (formula)
  defined in
  // features engine
  val SeniorityDifficulty = OperationFeatureDef("seniority:
  CourseDifficulty",
      CrossOperation(Seniority.name, CourseDifficulty.name))
  //... other features
}
```

Feature registry 140 may be stored in persistent storage 130 or separate from persistent storage. Feature engine 150 may access a copy of feature registry 140 in volatile memory. Alternatively, feature registry 140 may access feature engine 150 to compute derived features on demand.

In an embodiment, feature registry 140 lists not only raw features, but also all features derived on-the-fly. For such derived features, feature registry 140 includes a formula regarding how to compute such features. Such formulas are removed from model specification files. This aspect guarantees consistency across features used in different model specifications and also simplifies writing model specifications.

In an embodiment, feature registry 140 includes validation functionality that ensures that model specification files only include features that exist in feature registry 140. This validation functionality prevents including features that do not exist (e.g., by mistake, such as a typo in a feature name).

In an embodiment, feature registry 140 contains not just feature names, but also some additional metadata about features. For example, feature registry 140 specifies, for each of one or more features, an object type that the feature describes (e.g., a member type, a course type, a job type, an event type), a storage location of the feature, and dates for which the feature is available.

In an embodiment, multiple feature registries exist. Each feature registry corresponds to a different problem domain. For example, one feature registry lists features related to video recommendations, another feature registry lists features related to job recommendations, and another feature registry lists features related to advertisements. Each feature registry may list some features that are common to all feature registries, such as user or member-specific features and, thus, may correspond to the same subset of feature generation jobs.

Model Specification

Each of model specifications 160-164 specifies a name of a model (which may or may not be trained) and lists multiple features that are (or are to be) part of the model. Although three model specifications are depicted, system 100 may include more or fewer model specifications. In most cases, each model specification lists a strict subset of features listed in feature registry 140. Examples of machine learning techniques for training a model include logistic regression, XGBoost (an open-source software library that provides a gradient boosting framework for C++, Java, Python, R, and Julia), and GLMix (Generalized Linear Mixed effect).

Each of model specifications 160-164 may be formatted with a particular structure that is defined by a domain-specific language (DSL). Thus, when feature engine 150 receives, as input, a model specification, feature engine 150 may determine whether the model specification conforms to that DSL. If not, then feature engine 150 may generate a notification that indicates that the model specification is malformed. Also, feature engine 150 may cease processing the model specification and not generate any other output. Goals of the DSL are to be intuitive and simple. An example of a model specification is provided hereafter.

In an embodiment, a model specification specifies a feature that is not listed in feature registry 140 (referred to as "on-the-fly features") but that is based on one or more features that are listed in feature registry 140 (referred to as "existing features" or "dependent features"). (Alternatively, all features ("raw" and "on-the-fly") are specified in feature registry 140. In such an embodiment, each model specification specifies only features that exist in feature registry 140.) Examples of such an on-the-fly feature include (1) a feature that is a result of an operation of two existing features and (2) a feature that is a result of a transformation of an existing feature. Example operations include summation, subtraction, multiplication, division, modulo, comparison operations (e.g., greater than, less than), and some Boolean operations (e.g., AND, OR). Example transformations include a logarithmic transformation, some Boolean operations (e.g., NOT), a cross product operation between two feature vectors, and other operations (e.g., sizeof, bitwise shift, and dot product between two vectors). For example, a dot product between (1) a first set of skills that a member lists on his/her profile and (2) a second set of skills associated with one or more jobs that the member has viewed may be computed.

Thus, a model specification may refer to (1) existing or raw features that were computed offline or prior to the model specification being composed and (2) one or more on-the-fly features that are computed based on the existing feature(s) in response to processing the model specification. On-the-fly feature values might not be stored persistently for future access other than to (a) train a model or (b) be scored by a model.

In an embodiment, a model specification does not refer to any existing features. Instead, a model specification only specifies one or more on-the-fly features and, optionally, one or more existing features to not include in a model. In this way, a model specification may be fairly short.

In an embodiment, a user interface (provided by feature engineering system 100) displays contents of feature registry 140 and allows a user to create a new model based on features listed in the contents. What is displayed may include a name for each feature and, optionally, metadata of each feature, such as a description thereof. A user, operating a client device that is communicatively coupled to feature engineering system 100, selects a subset of the features listed (and, optionally, described) in the user interface. The user interface may also include an input field that allows the user to name the model specification that is being created. Once a user selects a subset of the features that are listed in the user interface, feature engineering system 100 (or a component thereof) generates a model specification that conforms to the DSL. In this way, a user is not required to be familiar with the DSL or to manually type out the name of each feature that the user desires for the model.

In a related embodiment, a user interface allows a user to retrieve and modify an existing model specification in order to generate a new model specification. Modifying may include removing a feature from the model specification, adding a feature to the model specification, changing an operation of a feature in the model specification, and/or changing a transformation of a feature in the model specification. The user interface either allows the user to provide a name for the new model specification or automatically generates a name of the new model specification, such as appending the current date/time and/or a version number to the name of the existing model specification.

Feature Engine

Feature engine 150 generates, based on a well-formed model specification, vectors of feature values, where each vector is a set of feature values. Each feature value in a vector corresponds to a different feature listed in the corresponding model specification. In the context of video recommendations, each vector may correspond to a different user-video pair.

Feature engine 150 may be implemented as a (e.g., Hadoop) job that is initiated manually or by a service that is running and that causes the job to run in response to, for example, a request from a client device.

For each feature that is listed in a model specification and feature registry 140, feature engine 150 reads the corresponding feature values from a particular location in persistent storage 130. The particular location in persistent storage 130 may be determined based on a name of the corresponding feature and/or based on location information that is part of an entry, in feature registry 140, that corresponds to the corresponding feature. Thus, the model specification does not need to specify any location information that indicates where the indicated feature values are stored.

For each feature that is defined in a model specification but not listed in feature registry 140 (such as features that are the result of operations or transformations), feature engine 150 reads the corresponding dependent feature value(s) from persistent storage 130 and performs the associated operation or transformation (as specified in the model specification).

Whether a model specification contains existing features or non-existing features that are associated with dependent features, feature engine 150 inserts each retrieved feature value into an entry of a vector. For example, the first feature listed in a model specification is inserted into the first entry of a vector, the second feature listed in the model specification is inserted into the second entry of the vector, and so forth. Alternatively, the resulting feature values are not inserted into a vector, but rather in a hash map, where the keys are feature name. In this technique, features are not indexed by their positions, but rather by their names.

Since different feature values of a single vector may be retrieved from different storage locations, it is important to know which feature values are associated with each other. For example, a model specification specifies features A, B, and C. Feature values for those features are located, respectively, a locations A, B, and C. In retrieving feature values from each location, an identifier associated with each feature value may be used to combine or join feature values into a single vector. For example, each of features A, B, and C may be keyed by a user identifier or an item identifier. When retrieving feature values of feature A from location A, a different identifier may be associated with each feature value. The same set of identifiers may be retrieved from locations B and C. Then, when creating vectors for features A, B, and C, the identifiers are used to join the three sets of feature values to compute a set of vectors, each vector containing multiple feature values that share a common identifier.

Each vector is either used by a downstream component to train a model or to score the vector using a trained model. In an embodiment, feature engine 150 operates in one of two modes: training or scoring. In training mode, each vector corresponds to a training instance and includes a label. In scoring mode, each vector does not include a label. Instead the vector is input to the trained model, which is applied to the vector to output a result, such as a classification or a probability.

A training component and a scoring component (not depicted) call feature engine 150 to generate feature vectors. In each call, these two components provide two arguments to feature engine 150: a mode (training/scoring) and a model specification. In scoring mode, the feature vectors may be generated in memory and returned to the scoring component for scoring. In training mode, the feature vectors may be stored in persistent storage and then consumed by the training module. In this context, feature engine 150 is not aware of the "trained model" and it does not provide suggestions for a name of a model to train.

Input that causes feature engine 150 to process a model specification may specify (or at least indicated) one of the two modes. For example, in both modes, a model specification is indicated in input to feature engine 150. If the input also includes a location of a trained model, then the mode is presumed to be the scoring mode, in which case the scoring component reads the trained model and applies the trained model to the feature vectors that feature engine 150 generates based on the model specification. As described in more detail below, the generated feature vectors for scoring are not written to disk, but may be directly used by the scoring component to generate scores using the trained model. If no location is included in the input, then, in an embodiment, training mode is presumed. Feature engine 150 generates feature vectors based on the model specification and writes the feature vectors to persistent storage.

As another example, feature engine 150 includes an API that may be called that takes, as parameters, a name of a model specification and a mode indicator that indicates which mode of feature engine 150 is being invoked. In a call invoking feature engine 150, if feature engine 150 receives a name of an existing model and the call indicates the training mode, then feature engine 150 may respond by requesting a user that initiated the call to confirm whether the user desires a new model be created, in which case a new name can be recommended to the user, or whether the user desires the model to score a set of users, a set of items, or a set of user-item pairings.

Similarly, in a call invoking feature engine 150, if feature engine 150 receives a name of a model that does not exist and the call indicates the scoring mode, then feature engine 150 may respond by requesting a user that initiated the call to confirm (a) whether the user desires an existing model to be used, in which case a new name can be requested from the user or a list of names of existing models are presented, to the user, from which to select, or (b) whether the user desires a new model to train.

In an embodiment, feature engine 150 determines, for each feature listed in a model specification, whether the feature is also listed in feature registry 140. If a model specification specifies a feature that is not found in feature registry 140, then feature engine 150 may either cease processing the model specification or continue processing the model specification in order to generate the vectors of feature values. If feature engine 150 continues processing the model specification despite one or more features not being listed in feature registry 140, then feature engine 150 presumes that those one or more features do not exist and generates vectors of feature values that do not include values for those one or more features.

Example Process

Figure 2:
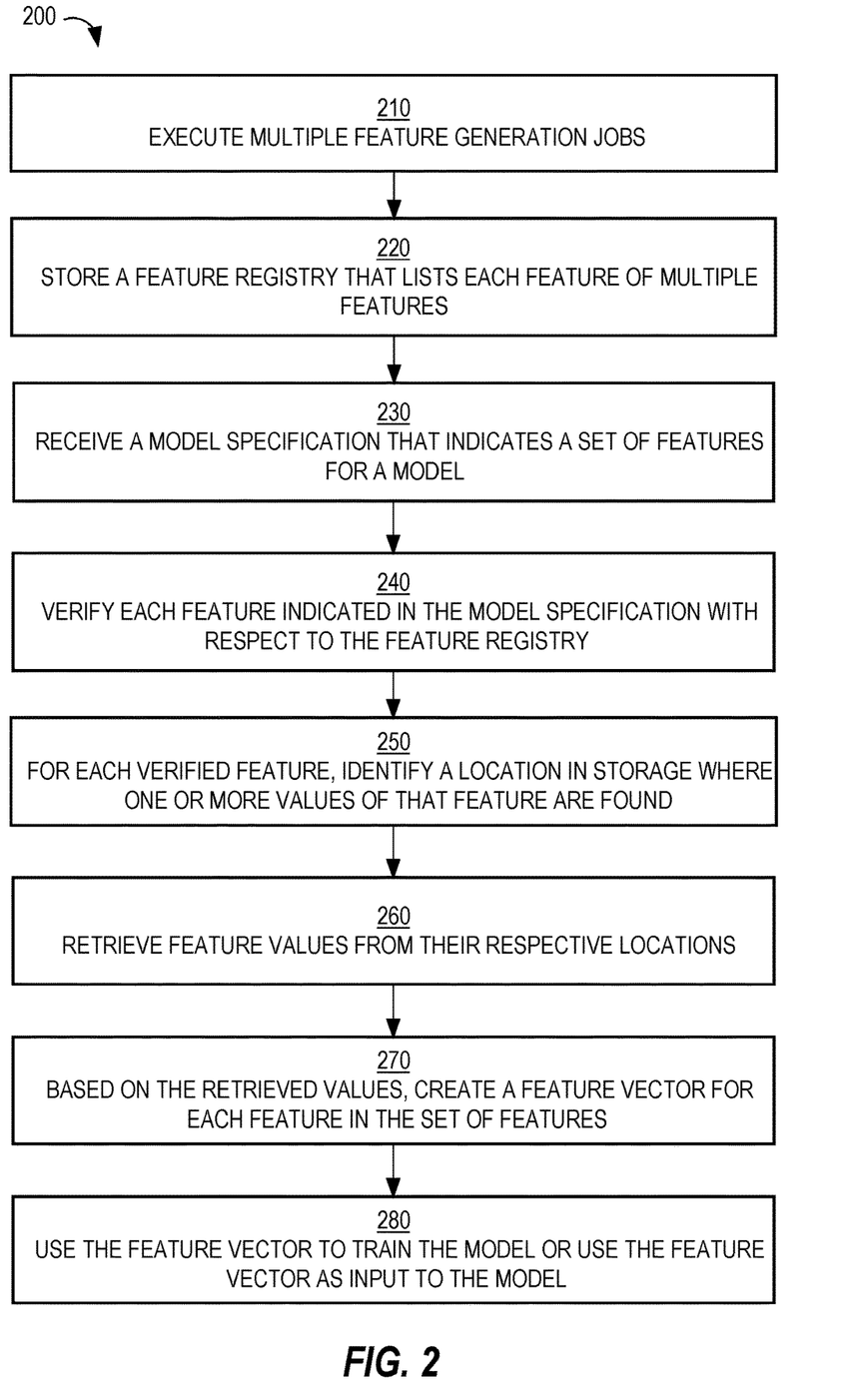
FIG. 2 is a flow diagram that depicts an example process for generating feature values for model training or model scoring, in an embodiment.

FIG. 2 is a flow diagram that depicts an example process 200 for generating feature values for model training or model scoring, in an embodiment. Process 200 may be performed by different components of feature engineering system 100.

At block 210, multiple jobs are executed, each of which computes a different set of feature values for a different set of features of multiple features. The jobs may be composed by the same user or by different users.

At block 220, a feature registry is stored that lists each feature of the multiple features. The feature registry may be created prior to the jobs executing.

At block 230, after the jobs are executed (or executing) and the feature registry is stored, a model specification is received that indicates (e.g., specifies) a set of features for a model. Blocks 230-270 may be performed by feature engine 150.

At block 240, in response to receiving the model specification, each feature specified in the model specification is verified with respect to the feature registry.

At block 250, for each feature verified in the feature registry, a location is identified in storage where one or more values for that feature are found.

At block 260, a value for that feature is retrieved from the location. Block 260 may involve retrieving a single feature value or multiple feature values beginning at the location.

At block 270, a feature vector is created that comprises, for each feature that is found in the feature registry, a feature value that corresponds to that feature.

At block 280, the feature vector is used to train the model or is used as input to the model that has already been trained. In the latter scenario, the model is used to score an item (or a set of items) based on the feature vector to which the item (or set of items) is associated. For example, an item may be a pairing of a particular user and a particular video item. The model may generate a score that reflects a likelihood that the user will click on (or otherwise select) the particular video item. Thus, blocks 270-280 may be performed multiple times per invocation of block 230 where a model specification is received.

In a related embodiment, a check with a feature registry is not performed. Instead, it is presumed that all the features indicated by the model specification already exist and that feature values for those features are available. This embodiment may be used in situations where the model specification extends an abstract class that already specifies (or otherwise indicates) the features. In these situations, the model specification may specify one or more on-the-fly features and/or indicate that one or more "default" features are not to be used when training or scoring.

Training

Separate from feature engineering system 100 is a model training component that receives a set of feature vectors from feature engineering system 100 and trains a model based on the feature vectors. The model training component may be implemented as a (e.g., Hadoop) job. In the training context, each feature vector either includes a label or is associated with a label. The model training component receives the set of feature vectors directed from feature engineering system 100. Alternatively, feature engineering system 100 stores the set of feature vectors in persistent storage (e.g., persistent storage 130) and the model training component retrieves the set of feature vectors from that persistent storage.

Scoring

Separate from feature engineering system 100 is a model scoring component that receives a set of feature vectors from feature engineering system 100 and scores each feature vector according a model indicated by the corresponding model specification. The model scoring component may be implemented as a (e.g., Hadoop) job. For example, feature engineering system 100 stores the set of feature vectors in persistent storage (e.g., persistent storage 130) and the model scoring component retrieves the set of feature vectors from that persistent storage.

In an alternative embodiment, feature engine 150 does not persistently store the set of feature vectors that are to be scored by the model scoring component. Instead, feature engine 150, after generating a feature vector for a particular model, causes the feature vector to be input to the particular model, which generates a result based on the feature vector. For example, the model scoring component retrieves the particular model from memory or from persistent storage and applies the particular model to each feature vector (also stored in memory as a result of feature engine 150). The result (or score) for each feature vector may be stored persistently, but the feature vector is not. This approach saves (1) processing power and time to persistently store the feature vectors and (2) processing power and time to retrieve the feature vectors from persistent storage.

When scoring mode is invoked, a list of user identifiers is provided and, for each of these users, a list of items (e.g., video courses (that comprise multiple video items) and/or individual video items) to be scored. The scoring component then invokes feature engine 150 to retrieve feature values for these members, items, and member-items pairs.

Example Feature Sets

The following is an example of a schema for a set of feature values stored in persistent storage 130:

```
{
  "type" : "record",
  "name" : "BasicFeatureSet",
  "namespace" : "com.linkedin.cups",
  "doc" : "A set of features keyed by a unique ID.",
  "fields" : [ {
      "name" : "uid",
      "type" : "long",
      "doc" : "A unique identifier for the set of features. Examples include memberId
          and contentId."
  }, {
      "name" : "features",
      "type" : {
        "type" : "array",
        "items" : {
          "type" : "record",
          "name" : "Feature",
          "fields" : [ {
              "name" : "name",
              "type" : "string",
              "doc" : "Name of a feature."
          }, {
              "name" : "term",
              "type" : "string",
              "doc" : "Term of a feature. This is a non-empty string when
                  a feature can take multiple nominal values, such as
                  gender."
          }, {
              "name" : "value",
              "type" : "float",
              "doc" : "Value of a feature."
          } ]
        }
      }
  } ]
}
```

Thus, each feature value follows a similar name-term-value format. As noted above, feature values are stored in persistent storage 130 as a result of feature generation jobs 110-114. Persistent storage 130 may also store training data that is based on past user interactions, such as impressions and user selections (such as clicks). The training data is keyed based on user/member identifier and a content item identifier (such as a video identifier, a course identifier, an advertisement identifier). The training data may indicate which content items were selected by which user and which content items were not. Some features (referred to herein as "pair features") may be orthogonal to user and content item features, but are relevant, such as "module position" and "day of week." The following is an example schema that includes pair features for course recommendations for members/users:

```
{
  "type" : "record",
  "name" : "MemberCoursePairing",
  "namespace" : "com.linkedin.cups.lynda",
  "fields" : [ {
      "name" : "memberId",
      "type" : "long",
      "doc" : "Member Id."
  }, {
      "name" : "courseId",
```

```
      "type" : "long",
      "doc" : "Course Id."
  }, {
      "name" : "pairFeatures",
      "type" : {
        "type" : "array",
        "items" : {
          "type" : "record",
          "name" : "Feature",
          "namespace" : "com.linkedin.cups",
          "fields" : [ {
              "name" : "name",
              "type" : "string",
              "doc" : "Name of a feature."
          }, {
              "name" : "term",
              "type" : "string",
              "doc" : "Term of a feature. This is a non-empty string when
                  a feature can take"
          }, {
              "name" : "value",
              "type" : "float",
              "doc" : "Value of a feature."
          } ]
        }
      },
      "doc" : "An array features specific to the actual pairing (event),
          and not to the member"
  }, {
      "name" : "label",
      "type" : "int",
```

```
"doc" : "Label for the response. This field will be consumed for
training purposes
} ]
}
```

Other identifiers may be associated with each training instance, such as a content provider identifier (that identifies a third-party content provider that provided the content) and a campaign identifier (that uniquely identifies a content delivery campaign, which may be one of many campaigns that a content provider initiates).

In an embodiment, in order to support functions across a variety of operations, feature objects stored according to the above schema are converted into a "sparse" feature set object. The conversion of a list to a map provides the ability for O(1) retrieval of multi-feature groupings (e.g., members' skills), since feature grouping may be retrieved multiple times across different operations. For example, if the following two features are added (memberskills*courseskills and memberskills*authorskills) and if the feature values are in a list format, then skill features would have to be iterated through twice. An example of a sparse feature set class is the following:

```
class SparseFeatureSet(_uid: Long, _features: Map[String,
SparseTermVector]) {
  def uid:Long = _uid
  def features:Map[String, SparseTermVector] = _features
  def size:Int = _features.size
  def hasFeature(featureName: String):Boolean = _features.contains
  (featureName)
  def getTermVector(featureName: String): Option[SparseTermVector] =
  _features.get(featureName)
}
```

The above example class refers to a SparseTermVector, which allows features to be represented in a vector format. Each SparseTermVector is a group of features in the same space. Representing features sharing a space as a SparseTermVector allows strict requirements to be placed on feature manipulation, such as a log transformation, as transformations should be applied across an entire vector and not on a single term. An example of a sparse term vector class is as follows:

```
class SparseTermVector(termVector:Map{String, Float]) {
  def size:Int = termVector.size
  def hasTerm(term:String):Boolean = termVector.contains(term)
```

```
  def getTermValue(term:String): Option[Float] = termVector.get(term)
}
```

Feature Transformations

As described above, feature transformations may be applied to existing features while generating feature vectors for subsequent training or scoring. The following is an example abstract feature transformation:

```
/**
 * Represents an abstract feature vector transformation
 *
 * @param _featureName
 */
abstract class Transformation(_featureName: String) {
  /**
   * Returns the feature name for which this transformation is on.
   *
   * @return
   */
  def feature: String = _featureName
  /**
   * Transform the specific feature in the feature set
   *
   * @param feature Set
   * @return
   */
  def transform(featureSet: SparseFeatureSet): Option
  [SparseTermVector] = {
    featureSet.getTermVector(_featureName).map(transformVector)
  }
  /**
   * Transform a feature vector.
   *
   * @param featureVector
   * @return
   */
  def transformVector(featureVector: SparseTermVector):
  SparseTermVector
}
```

Constructors taking a String as a parameter allows transformations to be defined using feature names rather than adding a complicated layer of create SparseTermVectors. This abstract class has a general transform on a SparseFeatureSet, from which the class performs retrieval of a SparseTermVector and calls the abstract transformVector method, which performs the transformation. Adding a new transformation is as simple as writing a new scala class that extends the Transformation class. The only method that needs to be overwritten is the transformVector method. The following is an example of a log transformation class that extends the abstract feature transformation class:

```
/**
 * Log Transformation on a SparseTermVector
 */
class LogTransformation(featName: String) extends Transformation(featName: String) {
  /**
   * Perform a log transformation on all term values in a term vector.
   *
   * @return
   */
  override def transformVector(termVector: SparseTermVector): SparseTermVector = {
    val logValues = termVector.getTermMap.mapValues { case rawValue =>
      Math.log(rawValue +1).toFloat
    }
    SparseTermVector(logValues)
  }
}
```

```
/**
 * Companion object for performing log transformations.
 */
object LogTransformation {
  def apply(featName: String): Transformation = new LogTransformation(featName)
}
```

Feature Operations

While a "transformation" takes a single feature name (which could have multiple terms) and produces a new feature, an "operation" takes two transformations or feature names and produces a new feature. In cases where only one side is transformed, an IdentityTransformation( ) can be used, which wraps an unchanged value. The following is an example of an Operation class:

```
/**
 * An abstract operation takes a transformable left and right hand side and returns
 * the result of an operation.
 *
 * @param _lhs
 * @param _rhs
 */
abstract class Operation(_lhs: Transformation, _rhs: Transformation) {
  /**
   * An alternate definition of Operation using feature names.
   * @param _lhsName
   * @param _rhsName
   */
  def this(_lhsName: String, _rhsName: String) = {
    this(IdentityTransformation(_lhsName), IdentityTransformation(_rhsName))
  }
  def leftFeature: String = _lhs.feature
  def rightFeature: String = _rhs.feature
  /**
   * Generates operate on two sparse feature sets and return a sparse term vector.
   *
   * @param lhsSet
   * @param rhsSet
   * @return
   */
  def operate(lhsSet: SparseFeatureSet, rhsSet: SparseFeatureSet):
    Option[SparseTermVector] _lhs.transform(lhsSet).flatMap { case
      lhsTransformed => _rhs.transform(rhsSet).map { case
        rhsTransformed => executeOp(lhsTransformed, rhsTransformed)
      }
    }
  }
  /**
   * Computes a sparse term vector from two input vectors.
   *
   * @param lhs
   * @param rhs
   * @return
   */
  def executeOp(lhs: SparseTermVector, rhs: SparseTermVector): SparseTermVector
}
```

As can be seen in the operate( ) method above, an Operator is given two feature sets and performs an operation on selected feature values (skills, in an example) from the left and right-hand sides. The output of an operation may be a one term vector, which represents a single feature. In the case of a dot-product or similarity operation, both of which output scalars, the term vector is a single termless entry. In the case of a cross-product operation, which outputs multiple feature values, the resulting term vector will have a length, and each term will identify a unique cross pair.

The following is an example of how a DotOperation might be written using the Operation interface:

```
/**
 * This class is used to perform a dot product operation between two term vectors.
 *
 * @param lhs A transformable term vector
```

-continued

```
 * @param rhs A transformable term vector
 */
class DotOperation(lhs: Transformation, rhs: Transformation) extends Operation(lhs:
    Transformation,
  /**
   * Calculate the dot product between two sparse term vectors
   *
   * @param lhs Left-hand portion of the operation
   * @param rhs Right-hand portion of the operation
   * @return
   */
  override def executeOp(lhs: SparseTermVector, rhs: SparseTermVector):
      SparseTermVector
    // Find the smaller of the two sparse vector in order to iterate more
    // efficiently
    val (smaller, larger) = if (lhs.size > rhs.size) {
      (rhs.getTermMap, lhs.getTermMap)
    } else {
      (lhs.getTermMap, rhs.getTermMap)
    }
    // Calculate the dot product
    val dotProduct = smaller.toSeq.map {case (key, value) =>
      value * larger.getOrElse[Float](key, 0F)
    }.sum
    // Return a sparse term vector of the dot product. The term is empty
    SparseTermVector(Map(" " -> dotProduct))
  }
}
/**
 * Companion object for creating DotOperations
 */
object DotOperation {
  def apply(lhs: String, rhs: String): DotOperation = {
    new DotOperation(IdentityTransformation(lhs), IdentityTransformation(rhs))
  }
  def apply(lhsTransform: Transformation, rhsTransform: Transformation): DotOperation
    = new DotOperation(lhsTransform, rhsTransform)
  }
}
```

In this example, the companion helper adds to different factory methods (one with Transformations and one without). This allows ease of definition by specifying that DotOperations (where a feature name and not a feature transformation are specified) are assumed to have an IdentityTransformation.

Defining a Model

A goal of the DSL is to make defining a new machine-learned model relatively easy. In an embodiment, a model specification contains a single list of features from feature registry 140, and feature registry 140 stores the details about these features (such as whether a feature is a member, a course feature, or a job feature) and which operations and transformations are used. In the following example abstract model, there is one abstract list that is overwritten in order to define a new model. This list specifies what features to include in a model.

```
abstract class FeatureJoinModel {
  /**
   * List of features used in a join model.
   */
  val features: List[FeatureDef]
  /**
   * Names of all basic features (i.e. features read from hdfs) that we need for
     the model:
   * that means features used either directly or in transformations/operations.
   *
   * This whitelist is used for early filtering of input dataset from hdfs.
   * @return
   */
  lazy val basicFeaturesWhitelist: Set[String] = {
    features.flatMap {
      case feature: BasicFeatureDef =>Seq(feature.name)
      case feature: TransformationFeatureDef =>
        Seq(feature.inputFeature.name)
      case feature: OperationFeatureDef =>
        Seq(feature.leftInputFeature.name,
          feature.rightInputFeature.name)
    }.to Set
  }
```

```
def filterFeatures(features: List[Feature]): List[Feature] = {
    features.filter { case feature =>
      basicFeaturesWhitelist.contains(feature.getName( ).toString)
    }
  }
}
def join(memberFeatures: SparseFeatureSet, courseFeatures: SparseFeatureSet,
    pairFeatures: SparseFeatureSet): SparseFeatureSet = {
  val allInputFeatures = SparseFeatureSet(" ", memberFeatures.features ++
      courseFeatures.features ++ pairFeatures.features)
  val generatedFeatures: List[(String, SparseTermVector)] =
    features.flatMap { feature =>
    feature.evaluate(allInputFeatures).map { case result =>
      (feature.name, result)
    }
  }
  SparseFeatureSet(createUid(memberFeatures.uid, courseFeatures.uid),
    generatedFeatures)
}
/**
 * Validate the output features, they should be unique
 */
def validateModelOutput( ): Unit = {
  features.map (_.name).groupBy(name => name).foreach { case
    (featureName, listOfFeatures) =>
    require(listOfFeatures.size < 2, s"Feature was added more than
      once: ${featureName}")
  }
}
def createUid(memberId: String, courseId: String): String = {
  s"${memberId}:${courseId}"
  }
}
```

In an alternative embodiment (though relatively more complicated than the above approach), an example abstract model contains four abstract lists that are overwritten in order to define a new model. These lists specify what features to include in a model:

memberCourseOperations=All new features that need to be produced as functions of member and course features memberSingletons=All member features that should be included courseSingletons=All course features that should be included pairSingleton=All pair features that should be included Although there are only four lists here, the abstract model could be expanded to accommodate coursePairOperations or memberPairOperations. Each Operation and Transformation are accompanied by a String, which specifies the output feature name. This flexibility is important in singleton cases so that a course feature named "skill" does not get confused with a member feature named "skill". The following is the example abstract model:

```
abstract class FeatureJoinModel {
  /**
   * Represents all member course feature operations used in a join model.
   *
   * NOTE: Member features are on the LHS of the operation.
   */
  val memberCourseOperations: List[(String, Operation)]
  val memberSingletons: List[(String, Transformation)]
  val courseSingletons: List[(String, Transformation)]
  val pairSingletons: List[(String, Transformation)]
  /**
   * Get a unique set of all member features utilized in this model
   */
  lazy val memberWhitelist: Set[String] = {
    val operationMemberFeats = memberCourseOperations.map { case (_, operation)
      => operation.leftFeature
    }
    val memberTransformFeats = memberSingletons.map { case (_ , transformation)
      => transformation.feature
    }
    (operationMemberFeats ++ memberTransformFeats).toSet
  }
  /**
   * Get a unique set of all course features utilized in this model
   */
  lazy val courseWhitelist: Set[String] = {
    val operationCourseFeats = memberCourseOperations.map { case (_, operation)
      => operation.rightFeature
    }
```

```
    val courseTransformFeats =courseSingletons.map { case (_, transformation) =>
      transformation.feature
    }
    (operationCourseFeats ++ courseTransformFeats).toSet
  }
  /**
   * Get a unique set of all pair features utilized in this model
   */
  lazy val pairWhitelist: Set[String] = {
    pairSingletons.map { case (_, transformation) =>
      transformation.feature
    }.to Set
  }
  def filterMemberFeatures(memberFeatures: List[Feature]): List[Feature] = {
    memberFeatures.filter { case feature =>
      memberWhitelist.contains(feature.getName( ).toString)
    }
  }
  def filterCourseFeatures(courseFeatures: List{Feature]): List[Feature] = {
    courseFeatures.filter { case feature =>
      courseWhitelist.contains(feature.getName( ).toString)
    }
  }
  def filterPairFeatures(pairFeatures: List[Feature]): List[Feature] = {
    pairFeatures.filter { case feature =>
      pairWhitelist.contains(feature.getName( ).toString)
    }
  }
  def join(memberFeatures: SparseFeatureSet, courseFeatures: SparseFeatureSet,
    pairFeatures: SparseFeatureSet): SparseFeatureSet = {
    //Get operation features
    val operationFeaturesFinal: List[(String, SparseTermVector)] =
      memberCourseOperations.flatMap { case (name, operation) =>
        operation.operate(memberFeatures, courseFeatures).map { case
          result => (name, result)
        }
      }
    val memberFeaturesFinal: List[(String, SparseTermVector)] =
      applyNamedTransformation(memberSingletons, memberFeatures)
    val courseFeaturesFinal: List[(String, SparseTermVector)] =
      applyNamedTransformation(courseSingletons, courseFeatures)
    val pairFeaturesFinal: List[(String, SparseTermVector)] =
      applyNamedTransformation(pairSingletons, pairFeatures)
    val featuresFinal = List(operationFeaturesFinal, memberFeaturesFinal,
      courseFeaturesFinal, pairFeaturesFinal).flatten
    SparseFeatureSet(createUid(memberFeatures.uid, courseFeatures.uid),
      featuresFinal)
  }
  /**
   * Apply named transformations
   *
   * @param transforms
   * @param feature Set
   * @return
   */
  def applyNamedTransformation(transforms: List[(String, Transformation)], feature Set: :
    List[(String, SparseTermVector)] = {
      transforms.flatMap { case (name, transformation) =>
        transformation.transform(featureSet).map { case result =>
          (name, result)
        }
      }
    }
  def createUid(memberId: String, courseId: String): String = {
    s"${memberId}:${courseId}"
  }
}
```

In this example abstract model, generic join and filter methods are included. The join method takes three SparseFeatureSets (member, course, pair) and uses these feature sets to calculate all the model features. The filter methods are used to filter a list of Features (at load time) for only the member or course features used in the model. This filter is populated using the feature names specified in the operation and singleton lists. A filter contains a whitelist of raw features that are used for a model. The whitelist is based on the features defined in the feature list of the corresponding model specification. Thus, the whitelist contains all raw features used directly in the model and all raw features that are required to compute derived features used in the model. By performing a filter, the feature join job can be significantly sped up. In the above example, one filter filters out members that do not appear in a whitelist, another filter filters out courses that do not appear in a whitelist, and another filter filters out pair features that do not appear in a whitelist. Conversely, a filter may filter out entities (e.g., members, courses, etc.) that appear in a blacklist.

Defining a new model within this framework is as easy as extending the FeatureJoinModel class and overriding the operation and singleton lists specified above. The following is a relatively simple example definition of a new model:

```
class FeatureJoinModelDemo extends FeatureJoinModel {
    override val features: List[FeatureDed] = List(
        /**
        * Add "skillOverlap" which is the DotOperation output
        between member
            "skills" and course "skills"
        */
        Features.TaxonomySkillOverlap,
        /**
        * Use job seeker score
        */
        Features.JobSeekerScore,
        /**
        * Use course monthly views
        */
        Features.CourseMonthlyViews,
        /**
        * Use the module position of a pairing.
        */
        Features.Position
    )
}
```

The following is a relatively simple example (that is based on the alternative embodiment above that overrides multiple abstract lists) that includes three features (the skill overlap between member and course, a member's job seeker score, and a log-transformed count of a course's views in the past month):

```
class FeatureJoinModelDemo extends FeatureJoinModel {
    /**
    * Create a new feature, "skillOverlap" which is the DotOperation output between
        "skills" and "skills" in the right-hand feature set.
    */
    override val memberCourseOperations: List[(String, Operation)] = List(
        ("skillOverlap", DotOperation("skills", "skills"))
    )
    /**
    * Use job seeker score, do not change its name, and do not transform it.
    */
    override val memberSingletons: List[(String, Transformation)] = List(
        ("job SeekerScore", IdentityTransformation("jobSeekerScore"))
    )
    /**
    * Use course monthly views, do not change its name, and perform a log
        transformation.
    */
    override val courseSingletons: List[(String, Transformation)] = List(
        ("courseMonthlyViews", LogTransformation("courseMonthlyViews"))
    )
    /**
    * Use the module position of a pairing and modify its name.
    */
    override val pairSingletons: List[(String, Transformation)] = List(
        ("position", IdentityTransformation("modulePosition"))
    )
}
```

As noted previously, one of the most painful processes in using a model is not the actual training pipeline itself, but rather the engineering effort in collecting features and constructing training and scoring sets. Although there may be more efficient custom solutions (than those outlined above) for joining features for use in each individual model, the effort in writing specific join jobs for each model is not intuitive and requires substantial amount of engineering effort. The above modeling DSL enables modelers to quickly specify how to join, collect, and operate on different features (e.g., member and course features) before outputting training or scoring vectors.

Therefore, embodiments described herein involve an improvement in computer-related technology. Indeed, the described feature engineering process is less error prone and increases model iteration, allowing model developers to arrive at more accurate machine-learned models faster.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
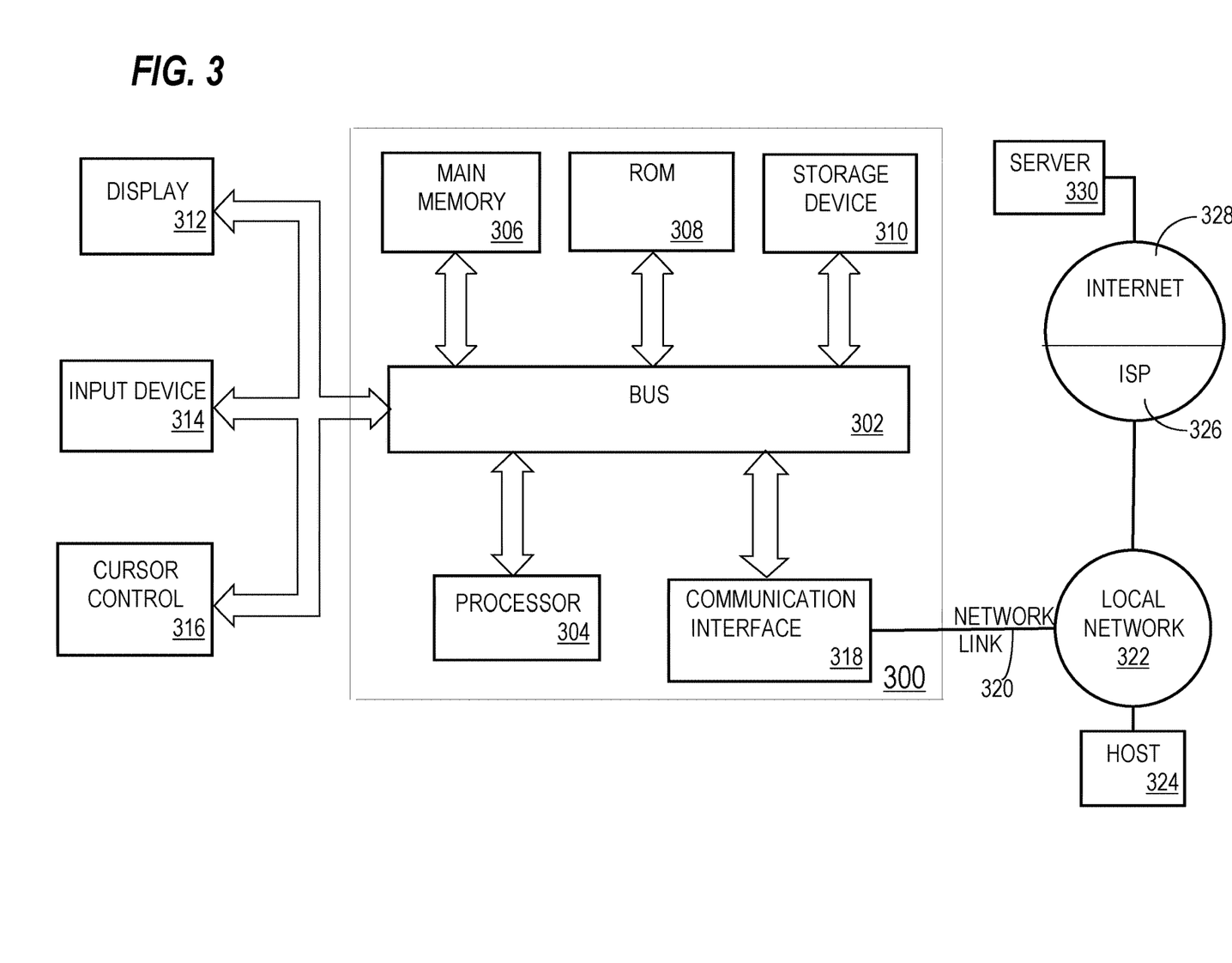
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
executing a plurality of jobs, each of which computes a different set of feature values for a different feature of a plurality of features associated with videos;
storing a feature registry that lists each feature of the plurality of features;
after executing the plurality of jobs and storing the feature registry, receiving a model specification that indicates a set of features for a model;
for each feature in a subset of the set of features:
identifying a location in storage where a value for said each feature is found, and
retrieving the value for said each feature from the location;
creating a feature vector that comprises, for each feature in the set of features, the value that corresponds to said each feature; and
using the feature vector to train the model or as input to the model that outputs a score relative to a particular user-video pair,
wherein the method is performed by one or more computing devices.

2. The method of claim 1, further comprising:
in response to receiving the model specification, verifying whether each feature is found in the feature registry.

3. The method of claim 2, further comprising:
in response to determining that a particular feature in the set of features is not found in the feature registry:
causing a notification about the particular feature to be generated and displayed, or
continuing processing the model specification while ignoring the particular feature, wherein the feature vector does not include a value for the particular feature.

4. The method of claim 1, wherein a particular feature is in the set of features but not in the subset of the set of features.

5. The method of claim 4, wherein the particular feature is a result of (a) a transformation of a feature that is in the subset of the set of features or (b) an operation that takes, as input, two features in the subset of the set of features.

6. The method of claim 1, wherein using the feature vector as input to the model is performed after creating the feature vector and without storing the feature vector in persistent storage.

7. The method of claim 1, wherein a set of users composed the plurality of jobs and a particular user that is not in the set of users composed the model specification.

8. The method of claim 1, wherein the model specification indicates a filter to apply to one or more features in the set of features, the method further comprising:
after retrieving a particular value for a particular feature of the one or more features, applying the filter to determine whether to include the particular value in a particular feature vector.

9. The method of claim 1, wherein using the feature vector comprises sending the feature vector to a training component that trains the model based on the feature vector.

10. The method of claim 1, wherein using the feature vector comprises sending the feature vector to a scoring component that scores the feature vector based on the model.

11. The method of claim 1, wherein the model specification extends an abstract model specification and overrides an operation list or a singleton list.

12. One or more storage media storing instructions which, when executed by one or more processors, cause:
executing a plurality of jobs, each of which computes a different set of feature values for a different feature of a plurality of features;
storing a feature registry that lists each feature of the plurality of features;
after executing the plurality of jobs and storing the feature registry, receiving a model specification that indicates a set of features for a model;
for each feature in a subset of the set of features:
identifying a location in storage where a value for said each feature is found, and
retrieving the value for said each feature from the location;
creating a feature vector that comprises, for each feature in the set of features, the value that corresponds to said each feature; and
using the feature vector to train the model or as input to the model.

13. The one or more storage media of claim 12, wherein the instructions, when executed by the one or more processors, further cause:
in response to receiving the model specification, verifying whether each feature is found in the feature registry.

14. The one or more storage media of claim 13, wherein the instructions, when executed by the one or more processors, further cause:
in response to determining that a particular feature in the set of features is not found in the feature registry:
causing a notification about the particular feature to be generated and displayed, or
continuing processing the model specification while ignoring the particular feature, wherein the feature vector does not include a value for the particular feature.

15. The one or more storage media of claim 12, wherein a particular feature is in the set of features but not in the subset of the set of features.

16. The one or more storage media of claim 15, wherein the particular feature is a result of (a) a transformation of a feature that is in the subset of the set of features or (b) an operation that takes, as input, two features in the subset of the set of features.

17. The one or more storage media of claim 12, wherein using the feature vector as input to the model is performed after creating the feature vector and without storing the feature vector in persistent storage.

18. The one or more storage media of claim 12, wherein a set of users composed the plurality of jobs and a particular user that is not in the set of users composed the model specification.

19. The one or more storage media of claim 12, wherein the model specification indicates a filter to apply to one or more features in the set of features, wherein the instructions, when executed by the one or more processors, further cause:
after retrieving a particular value for a particular feature of the one or more features, applying the filter to determine whether to include the particular value in a particular feature vector.

20. The one or more storage media of claim 12, wherein using the feature vector comprises sending the feature vector to a training component that trains the model based on the feature vector.

* * * * *